(12) United States Patent
Li et al.

(10) Patent No.: US 10,372,893 B2
(45) Date of Patent: Aug. 6, 2019

(54) SENSOR-BASED AUTHENTICATION

(71) Applicant: International Business Machines Corporation, Armonk, NY (US)

(72) Inventors: Jing Li, Beijing (CN); Jie Ma, Nanjing (CN); Li Jun Mei, Beijing (CN); Jian Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/340,373

(22) Filed: Nov. 1, 2016

(65) Prior Publication Data

US 2018/0121638 A1   May 3, 2018

(51) Int. Cl.
  G06F 21/00   (2013.01)
  G06F 21/32   (2013.01)
  G06F 21/31   (2013.01)

(52) U.S. Cl.
  CPC ............ G06F 21/32 (2013.01); G06F 21/316 (2013.01)

(58) Field of Classification Search
  CPC ........................................... G06F 21/23
  USPC ............................................. 726/18
  See application file for complete search history.

(56) References Cited

U.S. PATENT DOCUMENTS

| | | | |
|---|---|---|---|
| 8,660,532 B2 | 2/2014 | Conti et al. | |
| 9,311,464 B2 | 4/2016 | Stuntebeck et al. | |
| 10,032,009 B2 * | 7/2018 | Ekambaram | G06F 21/316 |
| 2009/0320123 A1 * | 12/2009 | Yu | G06F 21/316 726/16 |
| 2013/0027184 A1 * | 1/2013 | Endoh | G06K 9/00013 340/5.83 |
| 2013/0055381 A1 * | 2/2013 | Hao | G06F 21/316 726/18 |
| 2013/0191908 A1 * | 7/2013 | Klein | G06F 21/36 726/18 |
| 2013/0212674 A1 * | 8/2013 | Boger | G06F 21/36 726/17 |
| 2013/0326592 A1 * | 12/2013 | Yamada | H04M 1/67 726/4 |
| 2015/0213244 A1 * | 7/2015 | Lymberopoulos | G06F 21/32 726/18 |
| 2015/0242605 A1 * | 8/2015 | Du | G06F 21/32 726/7 |
| 2015/0249922 A1 | 9/2015 | Vukoszavlyev et al. | |
| 2016/0057623 A1 * | 2/2016 | Dutt | H04W 12/06 455/411 |
| 2016/0210451 A1 * | 7/2016 | Hwang | G06F 21/316 |

* cited by examiner

*Primary Examiner* — Harris C Wang
(74) *Attorney, Agent, or Firm* — Fleit Gibbons Gutman Bongini Bianco PL; Donna Flores

(57) ABSTRACT

Embodiments of the present disclosure relate to a new approach for sensor-based authentication to enhance mobile security. In the computer-implemented method, motion related sensor data is obtained. A label of a behavior is determined wherein the behavior has a time information of the behavior. The label is associated with at least part of the motion related sensor data based on the time information of the behavior and the time information of the motion. At least one comparable motion is determined from the associated part of motion related sensor data. At least one motion passcode based on the determined comparable motion is identified.

14 Claims, 3 Drawing Sheets

SENSOR-BASED AUTHENTICATION

BACKGROUND

The present invention relates to handheld device security, and more specifically, to enhancing user authentication experience on a handheld device.

More and more people are using handheld devices, for example mobile devices, in public areas like subways, buses, and other crowded environments. Other people around a user can easily look at the screen and see an inputted user name and password. A figure based password is a frequently used technique for authentication, but figure based passwords are easily cracked, for example by peeking. Thus, for mobile devices, the design of authentication is tending to be more convenient and secure.

Therefore, how to enhance user authentication experience on handheld devices for both convenience and security is a challenge in modern days.

SUMMARY

Example embodiments of the present disclosure provide a new approach for enhancing user authentication experience on a handheld device.

In one aspect, a computer-implemented method is provided. In the method, motion related sensor data is obtained. A label of a behavior is determined, wherein the behavior has time information of the behavior. The label is associated with at least part of the motion related sensor data based on the time information of the behavior and the time information of the motion. At least one comparable motion is determined from the associated part of motion related sensor data, and at least one motion passcode is identified based on the determined comparable motion.

In another aspect, a device is provided. The device includes a processing unit and a memory coupled to the processing unit and storing instructions thereon. The instructions may be executed by the processing unit to obtain motion related sensor data, determine a behavior wherein the behavior has time information of the behavior, associate the label with at least part of the motion related sensor data based on the time information of the behavior and time information of the motion, determine at least one comparable motion from the associated part of motion related sensor data, and identify at least one motion passcode based on the determined comparable motion.

In yet another aspect, a computer program product is proposed. The computer program product is tangibly stored on a non-transient machine-readable medium and comprises machine-executable instructions. The instructions, when executed on an electronic device, cause the electronic device to perform the following operations. The operations comprise: obtaining motion related sensor data, determining a label of a behavior wherein the behavior has time information of the behavior, associate the label with at least part of the motion related sensor data based on the time information of the behavior and time information of the motion, determine at least one comparable motion from the associated part of motion related sensor data, and identify at least one motion passcode based on the determined comparable motion.

In yet another aspect, a computer-implemented method is provided. In the method, a label of a motion passcode is provided. Current motion related sensor data corresponding to a behavior performed according to the meaningful label is obtained. A comparable motion is determined from the motion related sensor data. The motion passcode is compared with the determined comparable motion, and authenticated based on the comparison.

Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
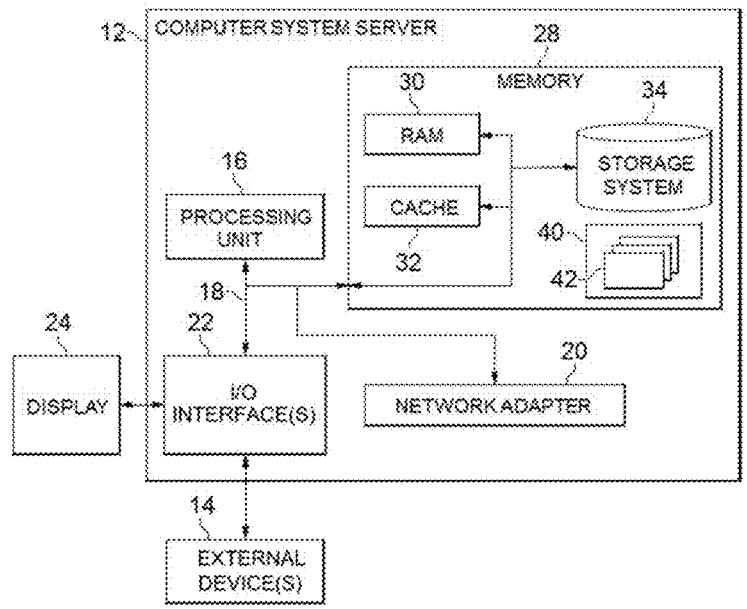
FIG. 1 is a block diagram illustrating a device suitable for implementing embodiments of the present disclosure.

Reference is first made to FIG. 1, in which an example electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. Computer system/server 12 may also include one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Modern handheld devices are equipped with a variety of sensors, such as an accelerometer, a gyroscope, a compass, and/or a barometer that automate or make many of our daily tasks easier.

For example, an accelerometer in a handheld device is used to detect the orientation of the handheld device. The gyroscope, or "gyro" for short, adds an additional dimension to the information supplied by the accelerometer by tracking rotation or twist. An accelerometer measures linear acceleration of movement, while a gyro, on the other hand, measures the angular rotational velocity. In practice, an accelerometer will measure the directional movement of a device and a gyro will resolve the device's lateral orientation or tilt during that movement.

Such sensors embedded in the handheld device may be leveraged to enhance mobile authentication for both convenience and security. However, in traditional authentication processes, a user has to perform a behavior predefined beforehand and then the predefined behavior will be used to compare with a new behavior performed by the user.

However, it is inconvenient for the user to set a predefined behavior. An embodiment of the present invention does not require users to predefine a behavior. At least one motion passcode may be identified using the present disclosure. More specifically, when a handheld device is in the operation of authentication, by using an identified motion passcode, the system of the handheld device will ask user to perform the identified motion passcode for the authentication.

Figure 2:
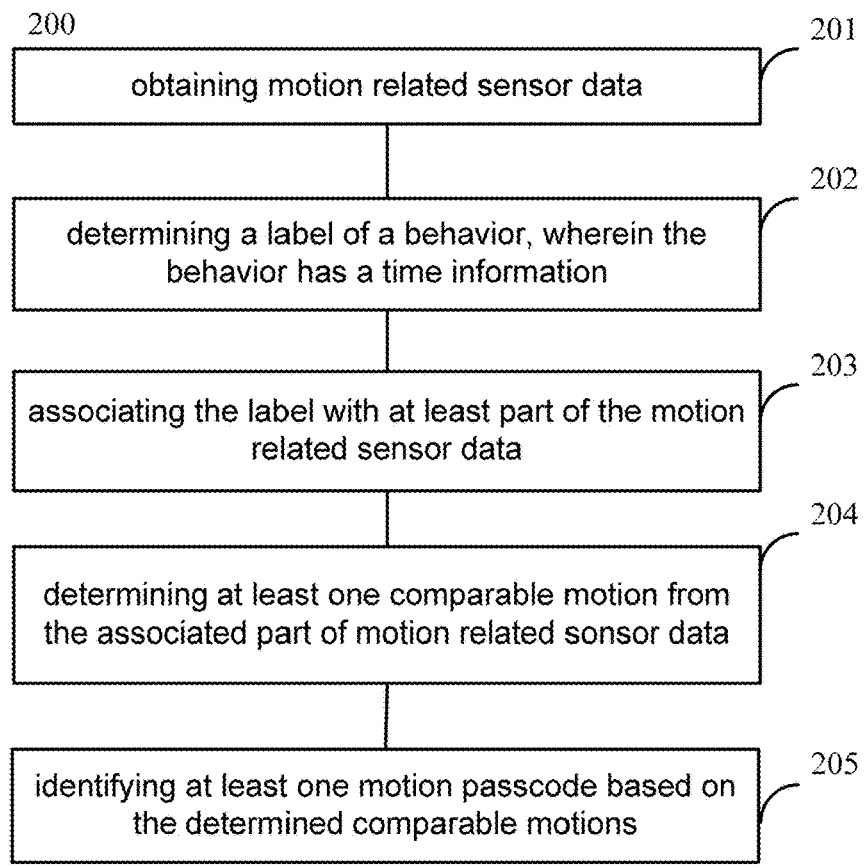
FIG. 2 shows a flow diagram of a method for identifying at least one motion passcode in accordance with embodiments of the present disclosure.

Now some exemplary embodiments will be described in detail. FIG. 2 shows a flow diagram of a method for identifying at least one motion passcode in accordance with exemplary embodiments of the present disclosure.

In step 201, motion related sensor data is obtained.

In an embodiment, the motion related sensor may be obtained in real-time, or alternatively, the motion related sensor may be obtained from recorded sensor data.

When a handheld device is in use, the device will be moved by a user's various usage behavior. The motion related sensor data reflects the movement of the handheld device, and in order to obtain motion related sensor data, at least one motion related sensor embedded in a handheld device may be leveraged to generate raw sensor data, at least part of which will be used as the motion related sensor data.

In one embodiment, in response to a movement of the handheld device, by using a combination of accelerometers and gyroscopes (sometimes also magnetometers), the raw sensor data may be obtained. The raw sensor data may include specific force, angular rate, and sometimes the magnetic field surrounding the handheld device.

Table 1, shown below, is an example of several rows of raw sensor data with corresponding timestamps obtained via accelerometers and gyroscopes.

The obtained motion related sensor data might also include time information, for example the timestamp of each item of the raw sensor data, as shown in Table 1.

TABLE 1

| timestamp | pitch(rad) | roll(rad) | yaw(rad) | accX | accY | accZ |
|---|---|---|---|---|---|---|
| 10:06.7 | 0.015789 | −0.00563 | 2.466541 | −0.01654 | −0.007 | 0.982829 |
| 10:06.8 | 0.016074 | −0.005 | 2.46676 | −0.01777 | −0.00603 | 0.980392 |
| 10:06.9 | 0.016544 | −0.00524 | 2.467039 | −0.02024 | −0.00748 | 0.980149 |
| 10:06.9 | 0.016962 | −0.00575 | 2.466969 | −0.01728 | −0.00458 | 0.981367 |
| 10:07.0 | 0.017326 | −0.00629 | 2.466833 | −0.02641 | −0.00531 | 0.983804 |
| 10:07.1 | 0.017863 | −0.00755 | 2.466493 | −0.01901 | −0.00941 | 0.982586 |
| 10:07.2 | 0.017918 | −0.00153 | 2.46612 | −0.01259 | −0.00096 | 0.981611 |
| 10:07.2 | 0.017966 | −0.00157 | 2.466296 | −0.01851 | −0.00289 | 0.988191 |

In one embodiment, some unexpected movement interruptions may be removed before recording the motion related sensor data, because the raw sensor data may comprise some interference from background motion related sensor data. For example, if a handheld device is operated by a user in a vehicle, the motion related sensor data may include data reflecting the movement of the vehicle.

In step 202, at least one label of a behavior is determined, wherein the behavior has a corresponding time information of the behavior. In an embodiment, the label of behavior is meaningful, which means that the label of behavior is understandable to a user. In other words, when the user sees a prompt of the label, he/she knows what behavior/motion should be performed.

It should also be noted that, in some alternative implementations, the functions noted in the block may be performed in an order different from what is described in FIG. 2. For example, the two steps 201 and 202 shown in succession may, in fact, be executed in parallel, or may be executed in the reversed order.

Details of step 202 will be further described with reference to the description of determining a meaningful label of a behavior in FIG. 5.

Figure 5:
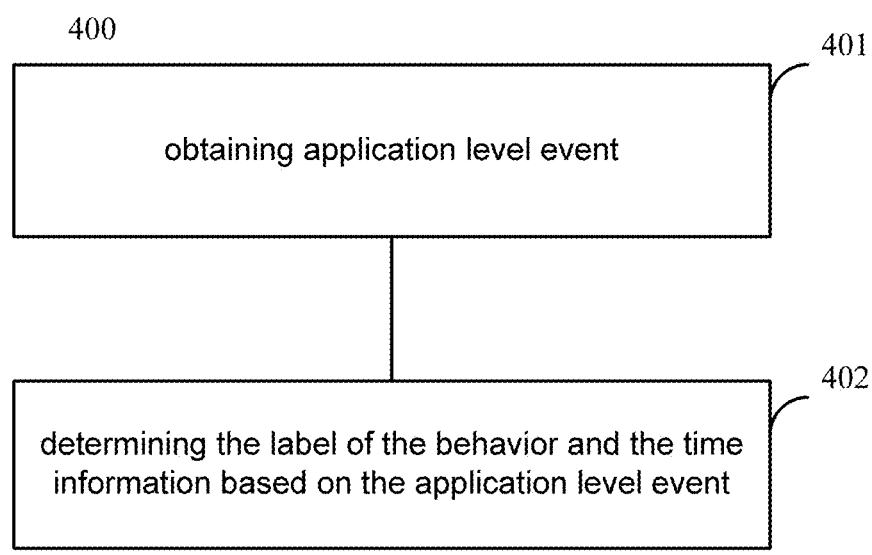
FIG. 5 shows a flow chart of a method for determining a label of a behavior in accordance with embodiments of the present disclosure.

FIG. 5 is a flow chart of a method for determining a label of a behavior in accordance with embodiments of the present disclosure.

In step 401, at least one application level event is obtained. Usually, lots of application level events may be obtained from the Operating System (OS) of a device. For example, in Android OS, a program can be developed to monitor application (APP) events from OS, such as, a launch event of an APP, a close event of an APP, a coming-in call event, a hang-up event for a call, an event of clicking button to take a picture, etc. It is to be understood by those skilled in the art that the present disclosure should not be limited to Android OS implements, but to any OS in a handheld device. In some embodiments, the obtained app-level events sequence may be recorded for further identification.

In step 402, the label of the behavior and the time information are determined based on the application level events. In order to identify the time information of the label of behaviors, a time window from one event to another event, such as from an incoming call event to a connection event, may also be identified based on the recored events sequence, and then a label, such as "answer a call" will be assigned to the time window, according to the function of the APP and/or the event type, and thus, a meaningful label "answer a call" and corresponding time window is identified. In an embodiment, the label could be extracted from the function of the APP and/or the event type directly. It is to be understood by those skilled in the art that in some further embodiments, at least one further process will be done to make the directly extracted label become easier to be understood by the user, such as map one extracted label to a more meaningful label by using a mapping table which maps name of the function to a phrase in natural language.

Now, returning to step 203 of method 200, the label is associated with at least part of the motion related sensor data based on the time information.

Based on the time information related with the meaningful label, such as the time window of the meaningful label, a piece of the motion related sensor data with the same time information is tailored for further comparison.

The label is associated with the piece of motion related sensor data.

In step 204, at least one comparable motion is determined from the associated part of motion related sensor data.

In one embodiment, comparable motion refers to transformed motion related sensor data. In other words, the associated part of motion related sensor data will be transformed to another form of data (i.e. transformed motion related sensor data), to facilitating further comparison. In a further embodiment, at least one level of comparable motion is transformed from the associated part of motion related sensor data (e.g., sensor level comparable motion, trajectory level comparable motion and biometric level comparable motion, etc.).

Figure 3:
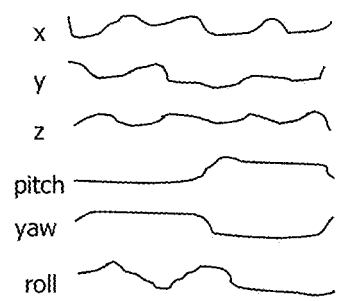
FIG. 3 shows a set of example curves generated according to the time-stamped raw sensor data in accordance with embodiments of the present disclosure.

In a first embodiment, the sensor level comparable motion is a set of curves generated based on the motion related sensor data. For example, an inertial measurement unit (IMU), which is a frequently used electronic device, is used to detect the current rate of acceleration using one or more accelerometers, and detect changes in rotational attributes (such as Pitch, Roll and Yaw) using one or more gyroscopes. Pitch, Roll and Yaw are three critical dynamics parameters, which are the angles of rotation in three dimensions about an object's centre of mass. FIG. 3 is a set of example curves generated according to a set of time-stamped raw data in accordance with embodiments of the present disclosure.

In a second embodiment, trajectory level comparable motion is generated from the motion related sensor data. There are many existing prior art examples to build the movement trajectory of a mobile device/moving object from 6 degrees of freedom (DoFs) or 9 DoFs using double integration method.

Figure 4:
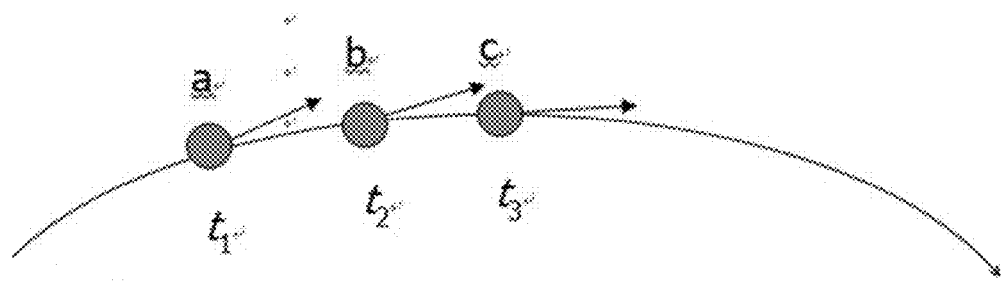
FIG. 4 shows an example trajectory level motion generated by the time-stamped raw data in accordance with embodiments of the present disclosure.

FIG. 4 is an example trajectory level of comparable motion generated by the time-stamped motion related sensor data in accordance with embodiments of the present disclosure.

According to one embodiment, a trajectory generation method includes the following steps: from an accelerometer, acceleration for a time t is captured. By integrating the acceleration, velocity curve can be obtained. By further integrating the velocity curve, a relative position curve can be obtained. A gyroscope and/or magnetometer can be used to further translate a relative position curve to an absolute movement trajectory in a geometry space.

In a third embodiment, biometric level comparable motion is generated from the trajectory curves based on the motion related sensor data. In this embodiment, the biometric level comparable motion comprises a set of feature points that are specific to a given user's motion, such as the movement of the user's arm when performing a behavior with a given label.

There are many existing prior art methods related to how to extract feature points from motion curves. For example, as shown in FIG. 4, at1 and bt2 are the extracted feature points, and <at1, bt2> is the extracted sequence of feature points, which will be taken as the biometric level comparable motion in accordance with present embodiment.

In step 205, at least one motion passcode is identified based on the determined comparable motions.

For each meaningful label, multiple corresponding "comparable motions" have been identified. In order to find the motion passcode, pattern of the behavior shall be identified. Details of this step will be further described with reference to the description of training of estimation model in FIG. 6.

Now return to the step of 205 of method 200.

In an embodiment, the identified motion passcode is stored with a corresponding meaningful label. The identified motion passcode will be used for comparison in the authentication phase.

Figure 6:
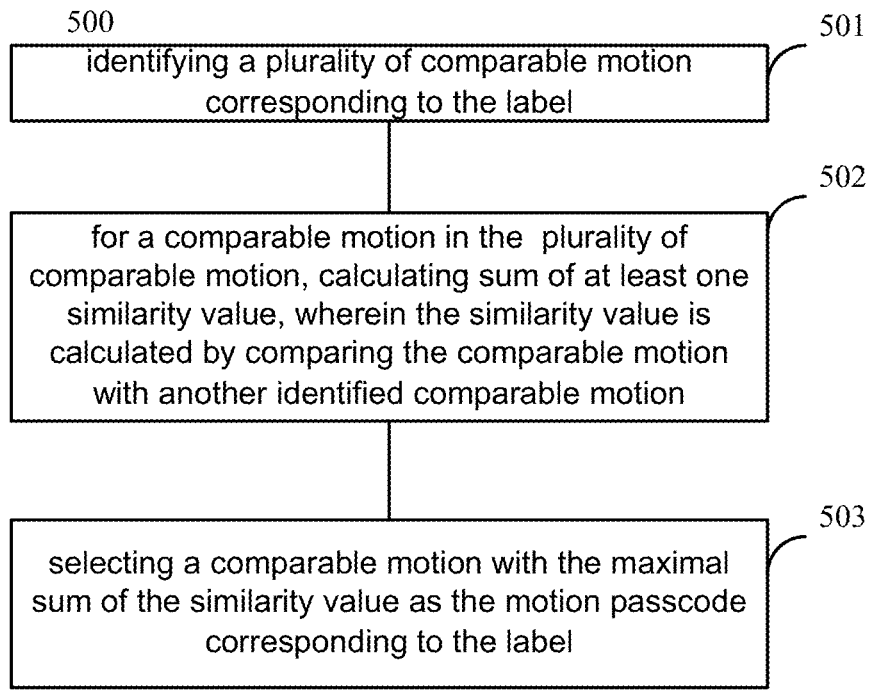
FIG. 6 shows a flow chart of a method for identifying at least one motion passcode based on the determined comparable motions in accordance with embodiments of the present disclosure.

FIG. 6 is a flow chart of a method for identifying at least one motion passcode based on determined comparable motions in accordance with embodiments of the present disclosure.

In step 501, a plurality of comparable motions corresponding to the label is identified.

As described above, for each given meaningful label, multiple corresponding "comparable motions" could be identified, more specifically multiple comparable motions corresponding to this given label could be identified from a large amount of comparable motions.

In step 502, for a comparable motion in the plurality of comparable motions, the sum of a plurality of similarity values is calculated, wherein, the similarity values are calculated by comparing the comparable motion with another identified comparable motion corresponding to a given label.

In some embodiments, a similarity value is calculated for each comparable motion.

In some embodiments, the similarity value is calculated by comparing the trajectory curves with other trajectory curves. In the embodiment of sensor level comparable motion, raw sensor curves movement is compared in the process of calculating similarity value. In the embodiment of trajectory level comparable motion, for better comparison results, three-dimensional trajectories of movement are compared in the process of calculating similarity value. To compare the similarity of curves, many different existing algorithms could be used.

In the embodiment of biometric level comparable motion, the comparable motion is a set of features points on trajectories, and the similarity of comparable motion is calculated based on the comparison of biometric features points.

In some embodiments, a bigger similarity value means a higher degree of similarity.

In step 503, a comparable motion with the maximum sum of the similarity values is selected as the motion passcode corresponding to the given label.

Figure 7:
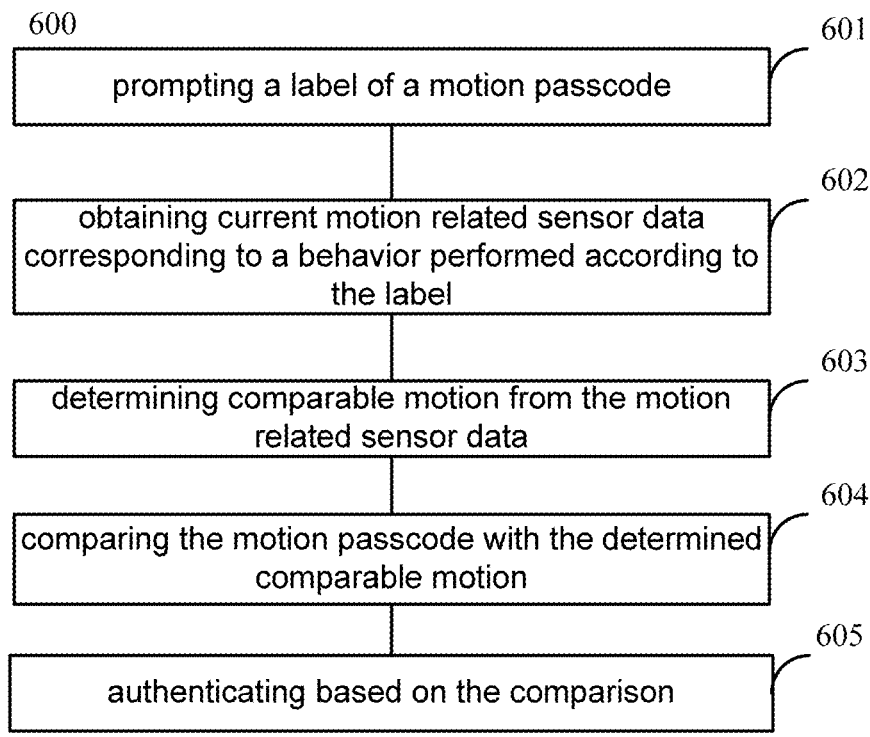
FIG. 7 shows a flow diagram of a method for authenticating based on the identified motion passcode in accordance with embodiments of the present disclosure.

FIG. 7 shows a flow diagram of a method for authentication based on the identified motion passcode in accordance with exemplary embodiments of the present disclosure.

In step 601, a label of a motion passcode identified by the method of 200 is prompted. As described above, each prompting label has a corresponding motion passcode learned through method 200. When a user sees the label, the user knows what behavior should be performed.

In step 602, motion related sensor data corresponding to a behavior perfomed according to the meaningful label is obtained. In an embodiment, in response to a user performing the behavior according to the indication of the prompt label, motion related sensor data corresponding to the current behavior will be obtained.

In step 603, comparable motion from the motion related sensor data is determined. This step is similar with step 204 in FIG. 2, so the detailed description is omitted here.

In step 604, the motion passcode is compared with the determined comparable motion. As described above, the label is stored with the corresponding motion passcode, therefore, by using a given label, it is easy to retrieve any stored motion passcode corresponding to the given label. And moreover, the comparison may be based on at least one level of determined comparable motion. This step of comparison is similar with the similarity value calculated in step 502 in FIG. 6, so the detailed description is omitted here.

In step 605, authentication is done based on the comparison result (such as a similarity value calculated by comparing the comparable motion with the motion passcode). In an embodiment, in response to the comparison result being greater than a predefined threshold, the authentication is successful. In another embodiment, in response to the comparison result being smaller than the predefined threshold, the authentication fails.

The authentication may be based on comparison of multiple levels of the determined comparable motion. Using such an authentication method, a weight may be given to each level of comparison. For example, a bigger weight may be given to a comparison result based on biometric level of comparable motion. The authentication is based on consolidation of all comparison results.

It should also be noted that, in some alternative implementations, the functions noted in the blocks may occur out of the order noted in the figures. For example, the two steps 602 and 603 shown in succession may, in fact, be executed substantially concurrently, or may be executed in the reversed order.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method comprising:
   obtaining motion related sensor data, wherein the motion related sensor data includes time information of motion;
   removing at least one unexpected movement interruption comprising interference from background motion related sensor data from the motion related sensor data;
   determining a label of a behavior, wherein the behavior includes time information of the behavior;
   associating the label with at least part of the motion related sensor data based on the time information of the behavior and the time information of motion;

determining at least one trajectory level of comparable motion from the at least part of the motion related sensor data associated with the label;
identifying a plurality of comparable motions corresponding to the label;
for each comparable motion in the plurality of comparable motions, calculating a sum of at least one similarity value, wherein, the similarity value is calculated by comparing the comparable motion with another identified comparable motion in the plurality of comparable motions; and
selecting a comparable motion with a maximum sum of the similarity value as a motion passcode corresponding to the label.

2. The method of claim 1, wherein determining a label of a behavior comprises:
obtaining an application level event; and
determining the label of the behavior and the time information based on the application level event.

3. The method of claim 1, wherein the comparable motion further comprises a biometric level of comparable motion.

4. The method of claim 1, wherein the associating the label with at least part of motion related sensor data comprises:
tailoring a piece of the motion related sensor data based on the time information; and
associating the label with the piece of motion related sensor data.

5. The method of claim 1, further comprising:
prompting for the label of the motion passcode corresponding to the label;
obtaining current motion related sensor data corresponding to a behavior performed according to the label;
determining a comparable motion from the motion related sensor data;
comparing the motion passcode corresponding to the label with the determined comparable motion; and
authenticating based on the comparison.

6. The method of claim 5, wherein the comparable motion further comprises a biometric level of comparable motion.

7. A device comprising:
a processing unit;
a memory coupled to the processing unit and storing instructions thereon, the instructions, when executed by the processing unit, performing acts including:
obtaining motion related sensor data, wherein the motion related sensor data includes time information of motion;
removing at least one unexpected movement interruption comprising interference from background motion related sensor data from the motion related sensor data;
determining a label of a behavior, wherein the behavior includes a time information of the behavior;
associating the label with at least part of the motion related sensor data based on the time information of the behavior and the time information of motion;
determining at least one trajectory level of comparable motion from the at least part of the motion related sensor data associated with the label;
identifying a plurality of comparable motions corresponding to the label;
for each comparable motion in the plurality of comparable motions, calculating a sum of at least one similarity value, wherein, the similarity value is calculated by comparing the comparable motion with another identified comparable motion in the plurality of comparable motions; and
selecting a comparable motion with a maximum sum of the similarity value as a motion passcode corresponding to the label.

8. The device of claim 7, wherein determining a label of a behavior comprises:
obtaining an application level event; and
determining the label of the behavior and the time information based on the application level event.

9. The device of claim 8, wherein the comparable motion further comprises a biometric level of comparable motion.

10. The device of claim 8, wherein the associating the label with at least part of motion related sensor data comprises:
tailoring a piece of the motion related sensor data based on the time information; and
associating the label with the piece of motion related sensor data.

11. A computer program product being tangibly stored on a non-transient machine-readable medium and comprising machine-executable instructions, the instructions, when executed on an electronic device, performing acts including:
obtaining motion related sensor data, wherein the motion related sensor data include time information of motion;
removing at least one unexpected movement interruption comprising interference from background motion related sensor data from the motion related sensor data;
determining a label of a behavior, wherein the behavior includes a time information of the behavior;
associating the label with at least part of the motion related sensor data based on the time information of the behavior and the time information of motion;
determining at least one trajectory level of comparable motion from the at least part of the motion related sensor data associated with the label;
identifying a plurality of comparable motions corresponding to the label;
for each comparable motion in the plurality of comparable motions, calculating a sum of at least one similarity value, wherein, the similarity value is calculated by comparing the comparable motion with another identified comparable motion in the plurality of comparable motions; and
selecting a comparable motion with a maximum sum of the similarity value as a motion passcode corresponding to the label.

12. The computer program product of claim 11, wherein determining a label of a behavior comprises:
obtaining an application level event; and
determining the label of the behavior and the time information based on the application level event.

13. The computer program product of claim 11, wherein the comparable motion further comprises biometric level of comparable motion.

14. The computer program product of claim 11, wherein the associating the label with at least part of motion related sensor data comprises:
tailoring a piece of the motion related sensor data based on the time information; and
associating the label with the piece of motion related sensor data.

* * * * *